Oct. 16, 1934.   H. S. SAWATZKY   1,977,597
EMERGENCY BRAKE RELEASE
Filed Jan. 30, 1933
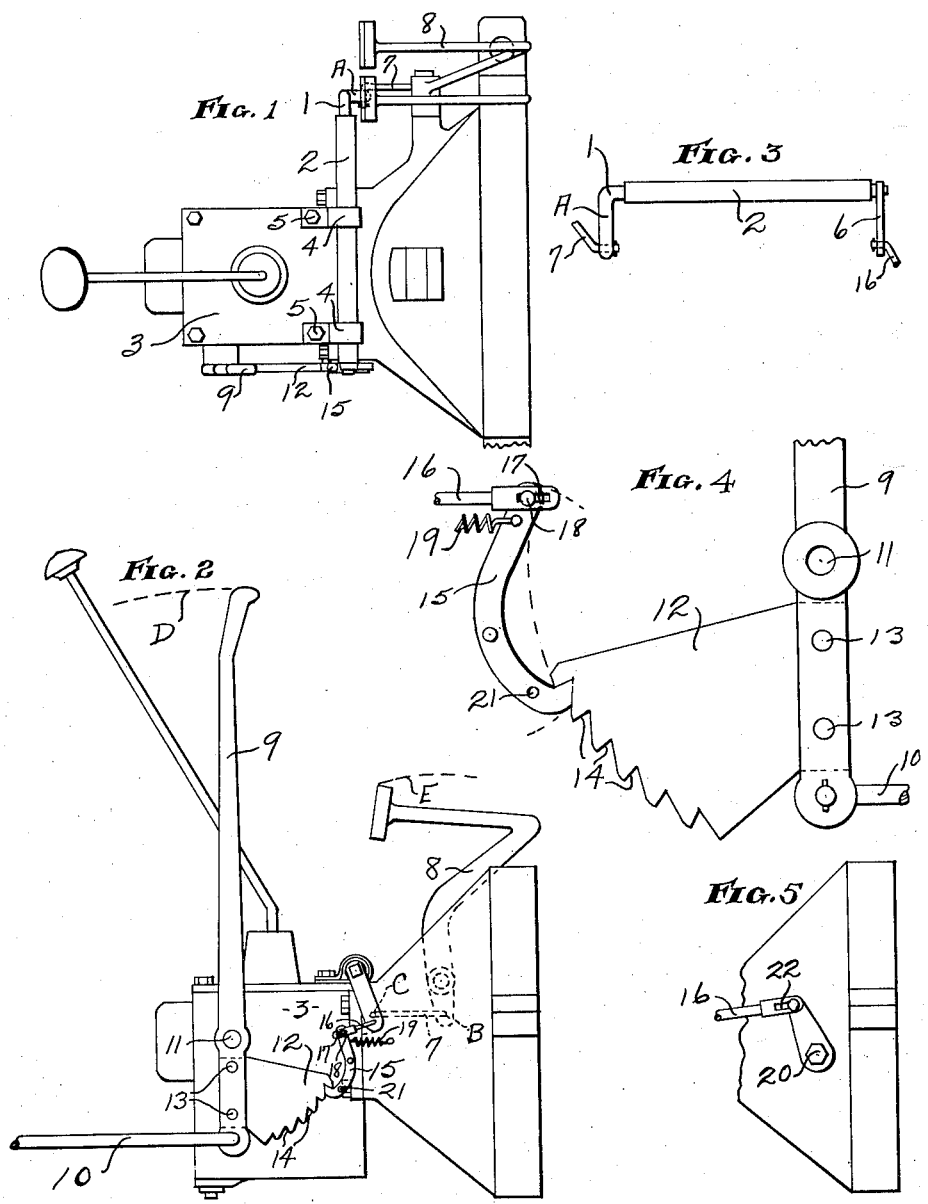
INVENTOR.
Henry S. Sawatzky
BY
U. G. Charles
ATTORNEY.

Patented Oct. 16, 1934

1,977,597

UNITED STATES PATENT OFFICE 1,977,597

EMERGENCY BRAKE RELEASE

Henry S. Sawatzky, Newton, Kans., assignor of one-half to Frank A. Janzen, Newton, Kans.

Application January 30, 1933, Serial No. 654,120

2 Claims. (Cl. 192—13)

My invention relates to improvements in an emergency brake release.

The object of my invention is to provide a release for emergency brakes automatically operated.

A further object of my invention is to actuate the release of an emergency brake by the movement of the clutch pedal.

A still further object of my invention is to provide an inexpensive hook up that will automatically release an emergency brake such as commonly employed in automobiles to avoid destruction of the friction elements should the operator fail to release the brake under the present arrangement.

These and other objects will hereinafter be more fully explained, reference being had to the accompanying drawing forming a part of this specification, and in which like characters will apply to like parts in the different views.

Referring to the drawing:

Fig. 1 is a plan view of a combined transmission and clutch housing with the invention applied.

Fig. 2 is a side view of Fig. 1.

Fig. 3 is a detail view of the crank actuating element.

Fig. 4 is an enlarged view of the inside of the ratchet mechanism.

Fig. 5 is a modified form and application of the crank with respect to the clutch housing fragmentarily shown.

My invention herein disclosed consists of a crank shaft 1 trunnioned in a pipe 2 that is secured to the transmission housing 3 by means of clamps 4 extending therearound and being secured by cap screws 5. The said shaft has a right angled bent portion as at A functioning for the purpose later described.

Removably secured to the other end of the shaft is an arm 6 for convenience of assembly, the said arm adapted to rock when the shaft is turned thru the medium of link 7 pivotally connected with the lower end of the clutch pedal 8 as at B, the other end of the link pivotally engaging with the lower end of the right angled bent portion A as at C, by which means the said shaft is turned in the pipe by the reciprocating movement of the clutch pedal in its control of the clutch simultaneously disengaging the emergency brake when the clutch is disengaged.

Pivotally arranged on the side of the transmission case is an emergency brake lever 9 and having attached to the lower end thereof is a brake rod 10 as actuating means for the brake when the lever is rocked on its pivot point 11. Between the pivot point and the lower end thereof to which said rod is connected is a toothed sector 12 secured to the lever by means of rivets 13, the teeth 14 of the sector move on an arc from the said pivot point 11 when the lever is rocked in either direction, and when drawn rearward as indicated by dotted lines D setting the emergency brake, the notched sector is engaged by a pawl 15 pivotally carried by the transmission case in working relation to the sector, by which means when the brake is brough to snug engagement the same is retained firmly and disengaged by forward movement of the clutch pedal 8 as indicated by dotted line E turning the said shaft, which in turn disengages the pawl thru the medium of a link 16 pivotally connecting arm 6 with the upper end of the said pawl as shown in Fig. 2. The said link has an elongated slot 17 in the end engaged by the pawl thru the medium of a pin 18 slidable in the slot engaged by the pawl, the object of which is to permit rocking movement from tooth to tooth as the said pawl jumps the said tooth, but being tensioned to engagement with the teeth thru the medium of a spring 19.

It is now clearly shown how the emergency brake is automatically released by disengaging the clutch at the time of shifting the gears thereby preserving the emergency brake from deterioration usually caused by oversight of releasing the brake by the driver of an automobile.

In Fig. 5 is shown a modification of the lever 6 and its link connection, the said lever is secured to a shaft by extending thru the clutch housing by a cap screw 20 passing thru an aperture in the lever and threadedly engaging in the shaft, the shaft not being shown in the drawing, but is employed in some makes of automobiles as the pivot point for the pedal operating the clutch, the pedal being the turning means for the shaft, and inasmuch as the arm extends upward and rocks in the opposite direction from that shown in Fig. 2, the other end of the link connects in an aperture 21 in the lower end of the pawl, in which case an elongated slot 22 provides for the rocking movement of the pawl, and such other modifications may be employed as lie within the scope of the appended claims, and having fully described my invention what I claim as new and desire to secure by Letters Patent is:—

1. In an emergency brake release of the class described, in combination with a transmission housing, an emergency brake lever and the lever of a clutch and the connecting rod of an emergency brake, a toothed sector secured to that portion of the emergency brake lever between its pivot connection to the transmission housing and the point of connection for the brake rod, the teeth of the sector on an arc from the lever pivot point, a pawl pivotally carried by the housing of the transmission one end to engage with the teeth of the sector, the other end spring tensioned and actuated by a link, a pipe and means to secure the same to the housing of the transmission, a shaft trunnioned in the pipe, the shaft having a portion of one end bent at right angles and a link connecting the same to the lever of the clutch and a removable arm secured to the other end, the shaft and a link connecting the free end of the arm with the spring tensioned end portion of the pawl, the last said link having an elongated slot for the engagement of a pin secured to the end of the pawl adjacent the spring.

2. In an emergency brake release of the class described in combination with a transmission housing, an emergency brake lever and the lever of a clutch and the connecting rod of an emergency brake, a toothed sector secured to that portion of the emergency brake lever between its pivot connection to the transmission housing and the point of connection for the brake rod, the teeth of the sector on an arc from the lever pivot point, a pawl pivotally carried by the housing of the transmission, one end to engage with the teeth of the sector, the other end spring tensioned and actuated by a link, a shaft trunnioned in working relation to the clutch lever and the pawl, and means to connect the shaft to the pawl and the clutch lever by which means the pawl is actuated by the movement of the clutch lever.

HENRY S. SAWATZKY.